United States Patent
Chung et al.

(10) Patent No.: US 9,856,608 B1
(45) Date of Patent: *Jan. 2, 2018

(54) METHOD FOR MANUFACTURING FIBER-BASED PRODUCED CONTAINERS

(71) Applicant: Footprint International, LLC, Scottsdale, AZ (US)

(72) Inventors: Yoke Dou Chung, Chandler, AZ (US); Brandon Michael Moore, Mesa, AZ (US); Yiyun Zhang, Gilbert, AZ (US)

(73) Assignee: Footprint International, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/342,524

(22) Filed: Nov. 3, 2016

Related U.S. Application Data

(63) Continuation of application No. 15/220,371, filed on Jul. 26, 2016.

(51) Int. Cl.

| | | |
|---|---|---|
| *D21J 7/00* | (2006.01) |
| *D21H 21/16* | (2006.01) |
| *D21J 5/00* | (2006.01) |
| *D21H 17/04* | (2006.01) |
| *D21H 17/17* | (2006.01) |
| *D21H 17/29* | (2006.01) |
| *D21H 17/56* | (2006.01) |
| *D21H 17/55* | (2006.01) |
| *D21H 11/14* | (2006.01) |
| *B65D 85/34* | (2006.01) |
| *B65D 1/26* | (2006.01) |
| *B65D 65/46* | (2006.01) |
| *B65D 81/34* | (2006.01) |
| *B65D 25/34* | (2006.01) |
| *B65D 25/14* | (2006.01) |
| *D21H 21/14* | (2006.01) |

(52) U.S. Cl.
CPC .............. *D21J 7/00* (2013.01); *B65D 1/26* (2013.01); *B65D 25/14* (2013.01); *B65D 25/34* (2013.01); *B65D 65/466* (2013.01); *B65D 81/3453* (2013.01); *B65D 85/34* (2013.01); *D21H 11/14* (2013.01); *D21H 17/04* (2013.01); *D21H 17/17* (2013.01); *D21H 17/29* (2013.01); *D21H 17/55* (2013.01); *D21H 17/56* (2013.01); *D21H 21/14* (2013.01); *D21H 21/16* (2013.01); *D21J 5/00* (2013.01)

(58) Field of Classification Search
USPC .................................................. 162/218, 228
See application file for complete search history.

(56) References Cited

U.S. PATENT DOCUMENTS 3,700,623 A * 10/1972 Keim .................... C08F 8/00
525/328.3
4,083,670 A 4/1978 Reifers et al.
(Continued)

FOREIGN PATENT DOCUMENTS

EP          2492395 A1 * 8/2012 ............. D21H 17/10

*Primary Examiner* — Benjamin Schiffman
(74) *Attorney, Agent, or Firm* — Jennings Strouss & Salmon, PLC; Michael K. Kelly

(57) ABSTRACT

Methods and apparatus for manufacturing vacuum forming a produce container using a fiber-based slurry. The slurry includes a moisture barrier comprising alkylketene dimer in the range of about 4% by weight, and a cationic liquid starch component in the range of 1%-7% by weight.

15 Claims, 16 Drawing Sheets

(56) References Cited

U.S. PATENT DOCUMENTS

| | | | |
|---|---|---|---|
| 4,214,948 | A | 7/1980 | Mozzarella et al. |
| 5,169,497 | A | 12/1992 | Sarkar et al. |
| 6,168,015 | B1 * | 1/2001 | Shimizu .............. G11B 33/0427 206/308.1 |
| 6,576,089 | B1 * | 6/2003 | Sato ......................... D21J 3/10 162/227 |
| 6,592,718 | B1 | 7/2003 | Wong |
| 8,632,659 | B2 | 1/2014 | Ehrnhardt et al. |
| 8,715,464 | B2 | 5/2014 | Young et al. |
| 9,370,912 | B2 | 6/2016 | Urban |
| 2005/0150624 | A1 | 7/2005 | Toh et al. |
| 2009/0043051 | A1 * | 2/2009 | Gu ......................... D21H 17/36 525/386 |
| 2009/0266737 | A1 | 10/2009 | Cole |
| 2015/0020987 | A1 * | 1/2015 | Sealey ................... D04H 1/425 162/162 |
| 2016/0016702 | A1 | 1/2016 | Siskindovich et al. |
| 2016/0221742 | A1 | 8/2016 | Edwards et al. |

\* cited by examiner

500

METHOD FOR MANUFACTURING FIBER-BASED PRODUCED CONTAINERS

RELATED APPLICATION

This is a continuation of U.S. application Ser. No. 15/220,371, filed Jul. 26, 2016.

TECHNICAL FIELD

The present invention relates, generally, to ecologically sustainable methods and apparatus for manufacturing containers and packaging materials and, more particularly, to the use of novel slurries for use in vacuum forming molded fiber products to replace plastics.

BACKGROUND

Pollution caused by single use plastic containers and packaging materials is epidemic, scarring the global landscape and threatening the health of ecosystems and the various life forms that inhabit them. Trash comes into contact with waterways and oceans in the form of bits of Styrofoam and expanded polystyrene (EPS) packaging, to-go containers, bottles, thin film bags and photo-degraded plastic pellets.

As this ocean trash accumulates it forms massive patches of highly concentrated plastic islands located at each of our oceans' gyres. Sunlight and waves cause floating plastics to break into increasingly smaller particles, but they never completely disappear or biodegrade. A single plastic microbead can be one million times more toxic than the water around it. Plastic particles act as sponges for waterborne contaminants such as pesticides. Fish, turtles and even whales eat plastic objects, which can sicken or kill them. Smaller ocean animals ingest tiny plastic particles and pass them on to us when we eat seafood.

Sustainable solutions for reducing plastic pollution are gaining momentum. However, continuing adoption requires these solutions to not only be good for the environment, but also competitive with plastics from both a performance and a cost standpoint. The present invention involves replacing plastics with revolutionary technologies in molded fiber without compromising product performance, within a competitive cost structure.

By way of brief background, molded paper pulp (molded fiber) has been used since the 1930s to make containers, trays and other packages, but experienced a decline in the 1970s after the introduction of plastic foam packaging. Paper pulp can be produced from old newsprint, corrugated boxes and other plant fibers. Today, molded pulp packaging is widely used for electronics, household goods, automotive parts and medical products, and as an edge/corner protector or pallet tray for shipping electronic and other fragile components. Molds are made by machining a metal tool in the shape of a mirror image of the finished package. Holes are drilled through the tool and then a screen is attached to its surface. The vacuum is drawn through the holes while the screen prevents the pulp from clogging the holes.

The two most common types of molded pulp are classified as Type 1 and Type 2. Type 1 is commonly used for support packaging applications with 3/16 inch (4.7 mm) to 1/2 inch (12.7 mm) walls. Type 1 molded pulp manufacturing, also known as "dry" manufacturing, uses a fiber slurry made from ground newsprint, kraft paper or other fibers dissolved in water. A mold mounted on a platen is dipped or submerged in the slurry and a vacuum is applied to the generally convex backside. The vacuum pulls the slurry onto the mold to form the shape of the package. While still under the vacuum, the mold is removed from the slurry tank, allowing the water to drain from the pulp. Air is then blown through the tool to eject the molded fiber piece. The part is typically deposited on a conveyor that moves through a drying oven.

Type 2 molded pulp manufacturing, also known as "wet" manufacturing, is typically used for packaging electronic equipment, cellular phones and household items with containers that have 0.02 inch (0.5 mm) to 0.06 inch (1.5 mm) walls. Type 2 molded pulp uses the same material and follows the same basic process as Type 1 manufacturing up the point where the vacuum pulls the slurry onto the mold. After this step, a transfer mold mates with the fiber package, moves the formed "wet part" to a hot press, and compresses and dries the fiber material to increase density and provide a smooth external surface finish. See, for example, stratasys.com/solutions/additivemanufacturing/tooling/molded-fiber; keiding.com/molded-fiber/manufacturing-process/; Grenidea Technologies PTE Ltd. European Patent Publication Number EP 1492926 B1 published Apr. 11, 2007 and entitled "Improved Molded Fiber Manufacturing"; and afpackaging.com/thermoformed-fiber-molded-pulp/. The entire contents of all of the foregoing are hereby incorporated by this reference.

Fiber-based packaging products are biodegradable, compostable and, unlike plastics, do not migrate into the ocean. However, presently known fiber technologies are not well suited for use with meat and poultry containers, prepared food, produce, microwavable food containers, and lids for beverage containers such as hot coffee.

Methods and apparatus are thus needed which overcome the limitations of the prior art.

Various features and characteristics will also become apparent from the subsequent detailed description and the appended claims, taken in conjunction with the accompanying drawings and this background section.

BRIEF SUMMARY

Various embodiments of the present invention relate to methods, chemical formulae, and apparatus for manufacturing vacuum molded, fiber-based packaging and container products including, inter alia: i) meat, produce, horticulture, and utility containers embodying novel geometric features which promote structural rigidity; ii) meat, produce, horticulture containers having embedded and/or topical moisture/vapor barriers; iii) vacuum tooling modified to re-direct spray nozzles to increase the size of vent holes in produce and horticulture containers; iv) microwavable/oven-heated containers embodying embedded and/or topical moisture, oil, and/or vapor barriers, and/or retention aids to improve chemical bonding; v) meat containers embodying a moisture/vapor barrier which preserves structural rigidity over an extended shelf life; vi) lids for hot beverage containers embodying a moisture/vapor barrier; and vii) vacuum tooling modified to include a piston for ejecting beverage lids having a negative draft from the mold.

It should be noted that the various inventions described herein, while illustrated in the context of conventional slurry-based vacuum form processes, are not so limited. Those skilled in the art will appreciate that the inventions described herein may contemplate any fiber-based manufacturing modality, including 3D printing techniques.

Various other embodiments, aspects, and features are described in greater detail below.

BRIEF DESCRIPTION OF THE DRAWING FIGURES

Exemplary embodiments will hereinafter be described in conjunction with the appended drawing figures, wherein like numerals denote like elements, and:

DETAILED DESCRIPTION OF PREFERRED EXEMPLARY EMBODIMENTS

The following detailed description of the invention is merely exemplary in nature and is not intended to limit the invention or the application and uses of the invention. Furthermore, there is no intention to be bound by any theory presented in the preceding background or the following detailed description.

Various embodiments of the present invention relate to fiber-based or pulp-base products for use both within and outside of the food and beverage industry. By way of non-limiting example, the present disclosure relates to particular chemical formulations of slurries adapted to address the unique challenges facing the food industry including oil barriers, moisture barriers, and water vapor barriers, and retention aids, the absence of which have heretofore prevented fiber-based products from displacing single use plastic containers and components in the food industry. The present disclosure further contemplates fiber-based containers having geometric and structural features for enhanced rigidity. Coupling these features with novel chemistries enables fiber-based products to replace their plastic counterparts in a wide variety of applications such as, for example: frozen, refrigerated, and non-refrigerated foods; medical, pharmaceutical, and biological applications; microwavable food containers; beverages; comestible and non-comestible liquids; substances which liberate water, oil, and/or water vapor during storage, shipment, and preparation (e.g., cooking); horticultural applications including consumable and landscaping/gardening plants, flowers, herbs, shrubs, and trees; chemical storage and dispensing apparatus (e.g., paint trays); produce (including human and animal foodstuffs such as fruits and vegetables); salads; prepared foods; packaging for meat, poultry, and fish; lids; cups; bottles; guides and separators for processing and displaying the foregoing; edge and corner pieces for packing, storing, and shipping electronics, mirrors, fine art, and other fragile components; buckets; tubes; industrial, automotive, marine, aerospace and military components such as gaskets, spacers, seals, cushions, and the like; and associated molds, wire mesh forms, recipes, processes, chemical formulae, tooling, slurry distribution, chemical monitoring, chemical infusion, and related systems, apparatus, methods, and techniques for manufacturing the foregoing components.

Figure 1:
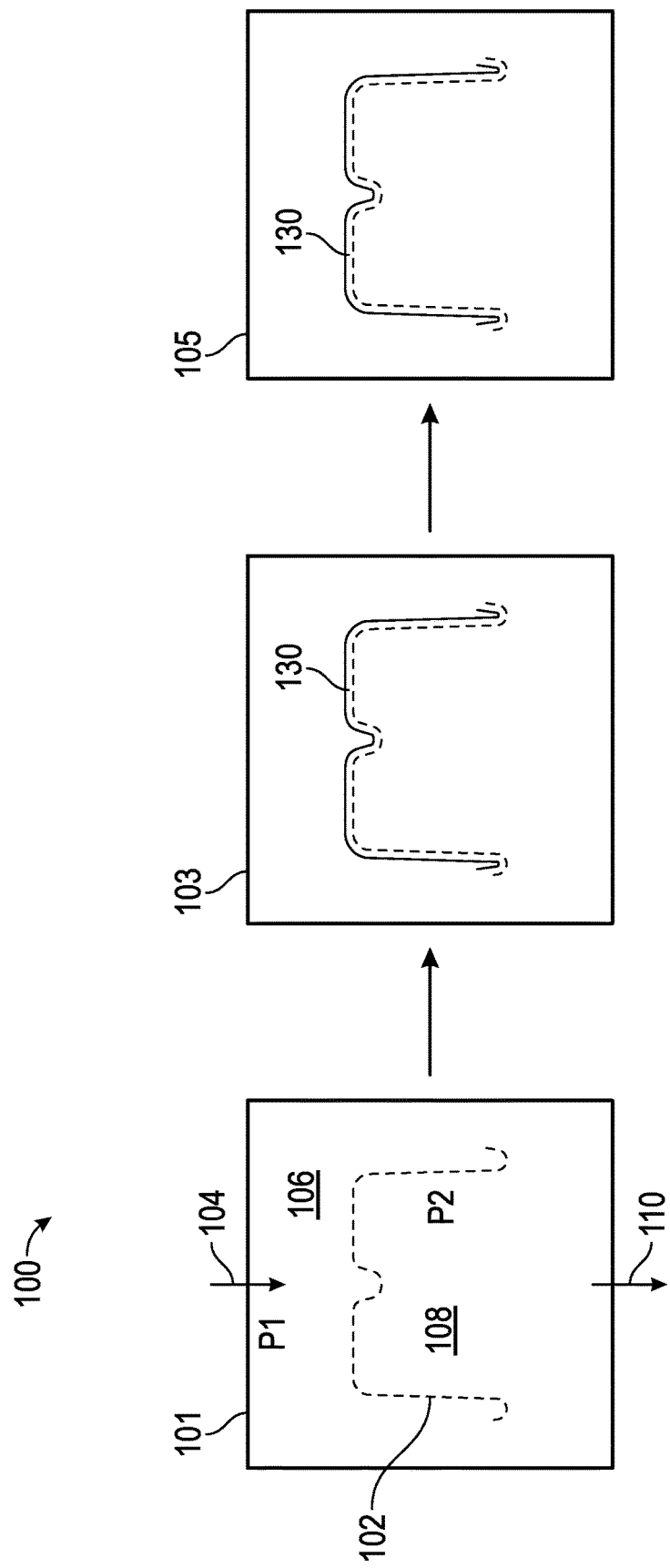
FIG. 1 is a schematic block diagram of an exemplary vacuum forming process using a fiber-based slurry in accordance with various embodiments.

Referring now to FIG. 1, an exemplary vacuum forming system and process 100 using a fiber-based slurry includes a first stage 101 in which mold (not shown for clarity) in the form of a mirror image of the product to be manufactured is envelop in a thin wire mesh form 102 to match the contour of the mold. A supply 104 of a fiber-based slurry 104 is input at a pressure (P1) 106 (typically ambient pressure). By maintaining a lower pressure (P2) 108 inside the mold, the slurry is drawn through the mesh form, trapping fiber particles in the shape of the mold, while evacuating excess slurry 110 for recirculation back into the system.

With continued reference to FIG. 1, a second stage 103 involves accumulating a fiber layer 130 around the wire mesh in the shape of the mold. When the layer 13o reaches a desired thickness, the mold enters a third stage 105 for either wet or dry curing. In a wet curing process, the formed part is transferred to a heated press (not shown) and the layer 130 is compressed and dried to a desired thickness, thereby yielding a smooth external surface finish for the finished part. In a dry curing process, heated air is passed directly over the layer 130 to remove moisture therefrom, resulting in a more textured finish much like a conventional egg carton.

In accordance with various embodiments the vacuum mold process is operated as a closed loop system, in that the unused slurry is re-circulated back into the bath where the product is formed. As such, some of the chemical additives (discussed in more detail below) are absorbed into the individual fibers, and some of the additive remains in the water-based solution. During vacuum formation, only the fibers (which have absorbed some of the additives) are trapped into the form, while the remaining additives are re-circulated back into the tank. Consequently, only the additives captured in the formed part must be replenished, as the remaining additives are re-circulated with the slurry in solution. As described below, the system maintains a steady state chemistry within the vacuum tank at predetermined volumetric ratios of the constituent components comprising the slurry.

Figure 2:
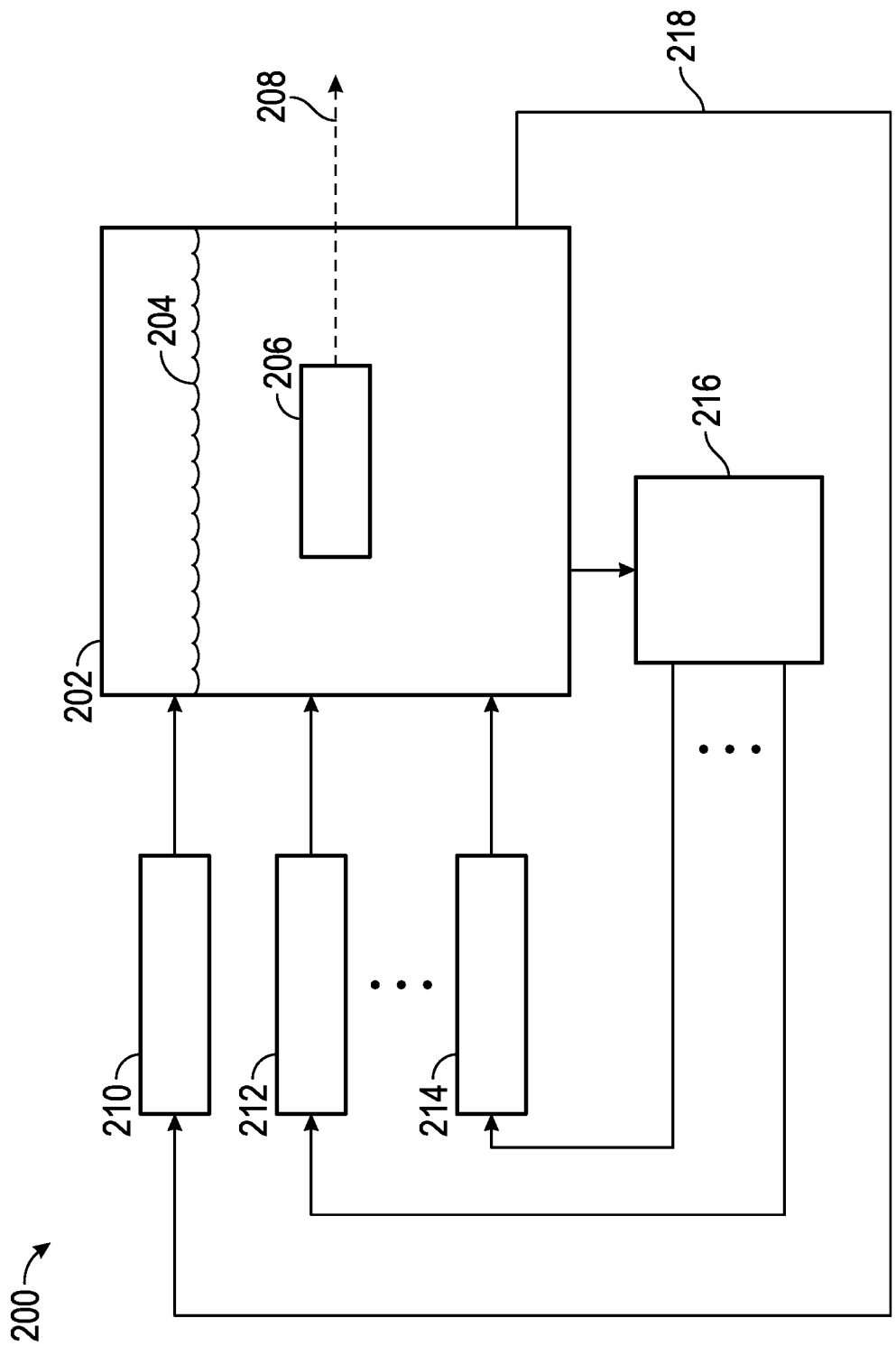
FIG. 2 is a schematic block diagram of an exemplary closed loop slurry system for controlling the chemical composition of the slurry in accordance with various embodiments.

Referring now to FIG. 2, is a closed loop slurry system 200 for controlling the chemical composition of the slurry. In the illustrated embodiment a tank 202 is filled with a fiber-based slurry 204 having a particular desired chemistry, whereupon a vacuum mold 206 is immersed into the slurry bath to form a molded part. After the molded part is formed to a desired thickness, the mold 206 is removed for subsequent processing 208 (e.g., forming, heating, drying, top coating, and the like).

In a typical wet press process, the Hot Press Temperature Range is around 150-250 degree C., with a Hot Press Pressure Range around 140-170 kg/cm$^2$. The final product density should be around 0.5-1.5 g/cm$^3$, and most likely around 0.9-1.1 g/cm$^3$. Final product thickness is about 0.3-1.5 mm, and preferably about 0.5-0.8 mm.

With continued reference to FIG. 2, a fiber-based slurry comprising pulp and water is input into the tank 202 at a slurry input 210. In various embodiments, a grinder may be used to grind the pulp fiber to create additional bonding sites. One or more additional components or chemical additives may be supplied at respective inputs 212-214. The slurry may be re-circulated using a closed loop conduit 218, adding additional pulp and/or water as needed. To maintain a steady state balance of the desired chemical additives, a sampling module 216 is configured to measure or otherwise monitor the constituent components of the slurry, and dynamically or periodically adjust the respective additive levels by controlling respective inputs 212-214. Typically the slurry concentration is around 0.1-1%, most ideally around 0.3-0.4%. In one embodiment, the various chemical constituents are maintained at a predetermined desired percent by volume; alternatively, the chemistry may be maintained based on percent by weight or any other desired control modality.

The pulp fiber used in 202 can also be mechanically grinded to improve fiber-to-fiber bonding and improve bonding of chemicals to the fiber. In this way the slurry undergoes a refining process which changes the freeness, or drainage rate, of fiber materials. Refining physically modifies fibers to fibrillate and make them more flexible to achieve better bonding. Also, the refining process can increases tensile and burst strength of the final product. Freeness, in various embodiments, is related to the surface conditions and swelling of the fibers. Freeness (csf) is suitably within the range of 200-700, and preferably about 220-250 for many of the processes and products described herein.

The chemical formulae (sometimes referred to herein as "chemistries") and product configurations for various fiber-based packages and containers, as well as their methods for manufacture, will now be described in conjunction with FIGS. 3-19.

Produce Containers

Figure 3:
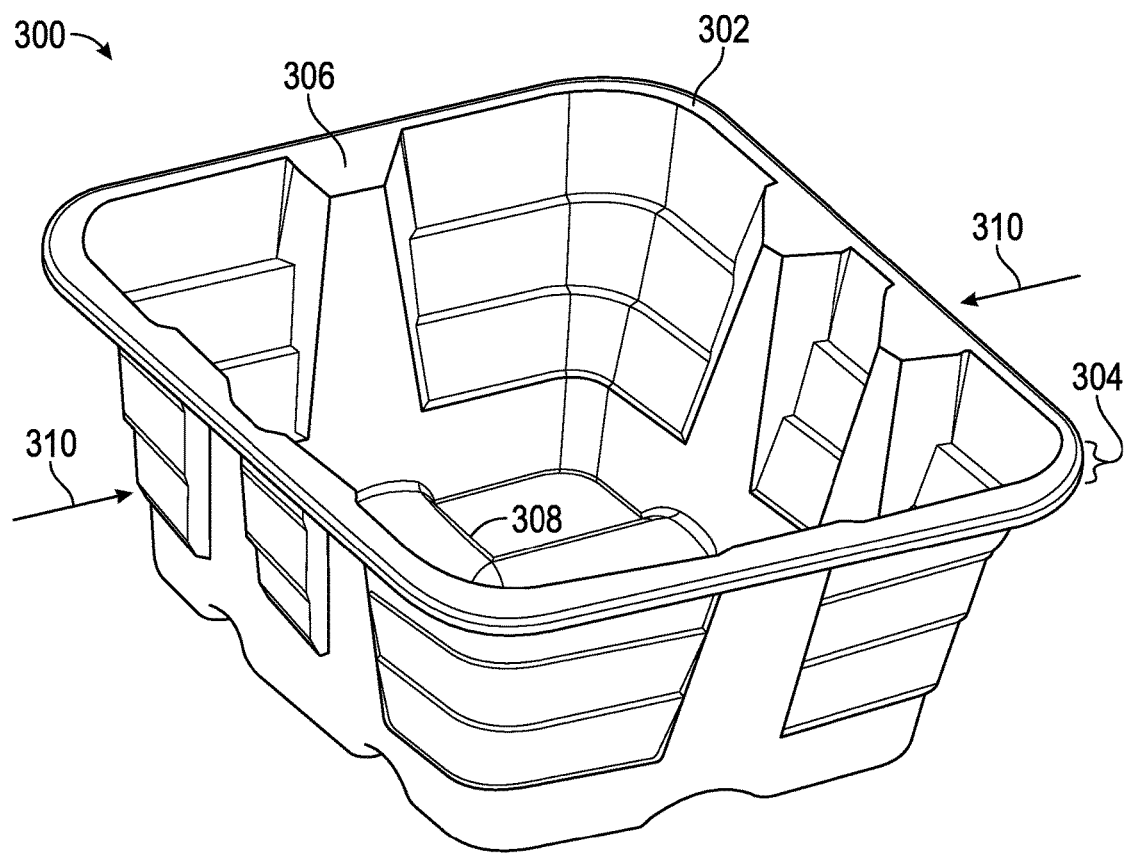
FIG. 3 is a perspective view of an exemplary produce container depicting a rolled edge, overhanging skirt, and ribbed structural features for enhancing hoop strength in accordance with various embodiments.

FIG. 3 is a perspective view of an exemplary produce container (e.g., mushroom till) 300 depicting a rolled edge 302, overhanging skirt 304, and various structural features including side panels exhibiting an outward bow, side ribs 306 and bottom ribs 308 for enhancing hoop strength. In this context, the term hoop strength refers to a measure of the applied lateral force along opposing vectors 310 versus the resulting deflection. Although the initial hoop strength of a container is primarily a function of geometry, hoop strength tends to degrade as the container absorbs moisture leached from its contents (e.g., mushrooms). The present inventor has determined that coupling various geometric features with slurry chemistries optimized for various applications can sustain hoop strength over extended shelf times. That is, by incorporating a moisture repellant barrier into the slurry (and/or applying a moisture repellant surface coating), the hoop strength may be maintained for a longer period of time even as the container contents bleed moisture.

Figure 4:
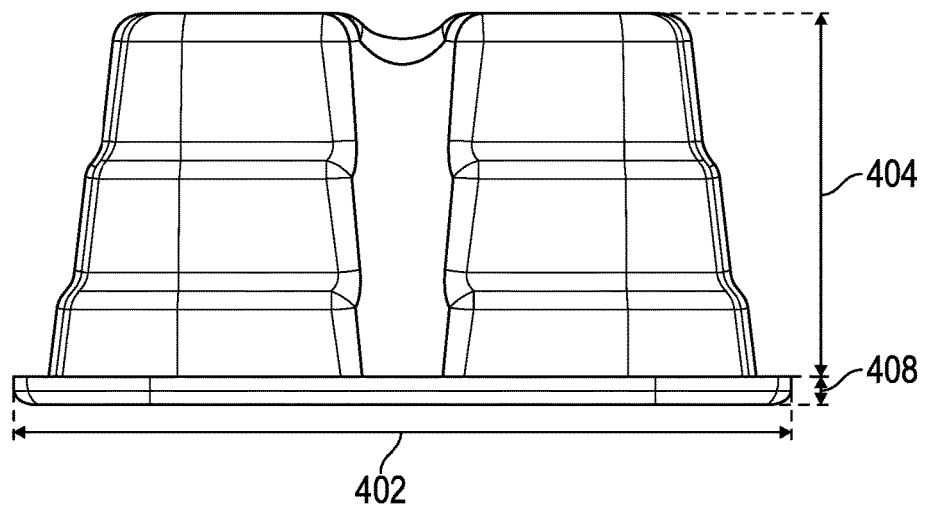
FIG. 4 is an end view of the container shown in FIG. 3 in accordance with various embodiments.

FIG. 4 is an end view of a container 400 generally analogous to the container shown in FIG. 3, and illustrates a width dimension 402, a height dimension 404, and a skirt length 408 in the range of 0.1 to 5 millimeters, and preferably about 1.5 mm. in the illustrated embodiment, the skirt extends downwardly; alternatively, the skirt may extend at an oblique or obtuse angle relative to a vertical plane. Width and height dimensions 402, 404 may be any desired values, for example in the range of 20 to 400 mm, and preferably about 60 to 200 mm.

As briefly mentioned above, the various slurries used to vacuum mold containers according to the present invention comprises a fiber base mixture of pulp and water, with added chemical components to impart desired performance characteristics tuned to each particular product application. The base fiber may include any one or combination of at least the following materials: softwood (SW), bagasse, bamboo, old corrugated containers (OCC), and newsprint (NP). Alternatively, the base fiber may be selected in which are hereby incorporated by this reference: "Lignocellulosic Fibers and Wood Handbook: Renewable Materials for Today's Environment," edited by Mohamed Naceur Belgacem and Antonio Pizzi (Copyright 2016 by Scrivener Publishing, LLC) and available at books.google.com/books?id=jTL8CwAAQBAJ&printsec=frontcover#v=onepage&q&f=false; "Efficient Use of Flourescent Whitening Agents and Shading Colorants in the Production of White Paper and Board" by Liisa Ohlsson and Robert Federe, Published Oct. 8, 2002 in the African Pulp and Paper Week and available at tappsa.co.za/archive/APPW2002/Title/Efficient_use_of_fluorescent_w/efficient_use_of_fluorescent_w.html; Cellulosic Pulps, Fibres and Materials: Cellucon '98 Proceedings, edited by J F Kennedy, G O Phillips, P A Williams, copyright 200 by Woodhead Publishing Ltd. and available at books.google.com/books?id=xO2iAgAAQBAJ&printsec=frontcover#v=onepage&q&f=false; and U.S. Pat. No. 5,169,497 A entitled "Application of Enzymes and Flocculants for Enhancing the Freeness of Paper Making Pulp" issued Dec. 8, 1992.

For vacuum molded produce containers manufactured using either a wet or dry press, a fiber base of OCC and NP may be used, where the OCC component is between 50%-100%, and preferably about 70% OCC and 30% NP, with an added moisture/water repellant in the range of 1%-10% by weight, and preferably about 1.5%-4%, and most preferably about 4%. In a preferred embodiment, the moisture/water barrier may comprise alkylketene dimer (AKD) (for example, AKD 80) and/or long chain diketenes, available from FOBCHEM at fobchem.com/html_products/Alkyl-Ketene-Dimer%EF%BC%88AKD-WAX%EF%BC%89.html#.V0zozvkrKUk; and Yanzhou Tiancheng Chemical Co., Ltd. at yztianchengchem.com/en/index.php?m=content&c=index&a=show&catid=38&id=124&gclid=CPbn65aUg80CFRCOaQod0JUGRg.

In order to yield specific colors for molded pulp products, cationic dye or fiber reactive dye may be added to the pulp. Fiber reactive dyes, such as Procion MX, bond with the fiber at a molecular level, becoming chemically part of the fabric. Also, adding salt, soda ash and/or increase pulp temperature will help the absorbed dye to be furtherly locked in the fabric to prevent color bleeding and enhance the color depth.

To enhance structural rigidity, a starch component may be added to the slurry, for example, liquid starches available commercially as Topcat® L98 cationic additive, Hercobond, and Topcat® L95 cationic additive (available from Penford Products Co. of Cedar Rapids, Iowa). Alternatively, the liquid starch can also be combined with low charge liquid cationic starches such as those available as Penbond® cationic additive and PAF 9137 BR cationic additive (also available from Penford Products Co., Cedar Rapids, Iowa).

For dry press processes, Topcat L95 may be added as a percent by weight in the range of 0.5%-10%, and preferably about 1%-7%, and particularly for products which need maintain strength in a high moisture environment most preferably about 6.5%; otherwise, most preferably about 1.5-2.0%. For wet press processes, dry strength additives such as Topcat L95 or Hercobond which are made from modified polyamines that form both hydrogen and ionic bonds with fibers and fines. Dry strength additives help to increase dry strength, as well as drainage and retention, and are also effective in fixing anions, hydrophobes and sizing agents into fiber products. Those additives may be added as a percent by weight in the range of 0.5%-10%, and preferably about 1%-6%, and most preferably about 3.5%. In addition, both wet and dry processes may benefit from the addition of wet strength additives, for example solutions formulated with polyamide-epichlorohydrin (PAE) resin such as Kymene 577 or similar component available from Ashland Specialty Chemical Products at ashland.com/products. In a preferred embodiment, Kymene 577 may be added in a percent by volume range of 0.5%-10%, and preferably about 1%-4%, and most preferably about 2% or equal amount with dosing of dry strength additives. Kymene 577 is of the class of polycationic materials containing an average of two or more amino and/or quaternary ammonium salt groups per molecule. Such amino groups tend to protonate in acidic solutions to produce cationic species. Other examples of polycationic materials include polymers derived from the modification with epichlorohydrin of amino containing polyamides such as those prepared from the condensation adipic acid and dimethylene triamine, available commercially as Hercosett 57 from Hercules and Catalyst 3774 from Ciba-Geigy.

In some packaging applications it is desired to allow air to flow through the container, for example, to facilitate ripening or avoid spoliation of the contents (e.g. tomatoes). However, conventional vacuum tooling typically rinses excess fiber from the mold using a downwardly directed water spry, thereby limiting the size of the resulting vent holes in the finished produce. The present inventor has determined that re-directing the spray facilitates greater fiber removal during the rinse cycle, producing a larger vent hole in the finished product for a given mold configuration.

Figure 5A:
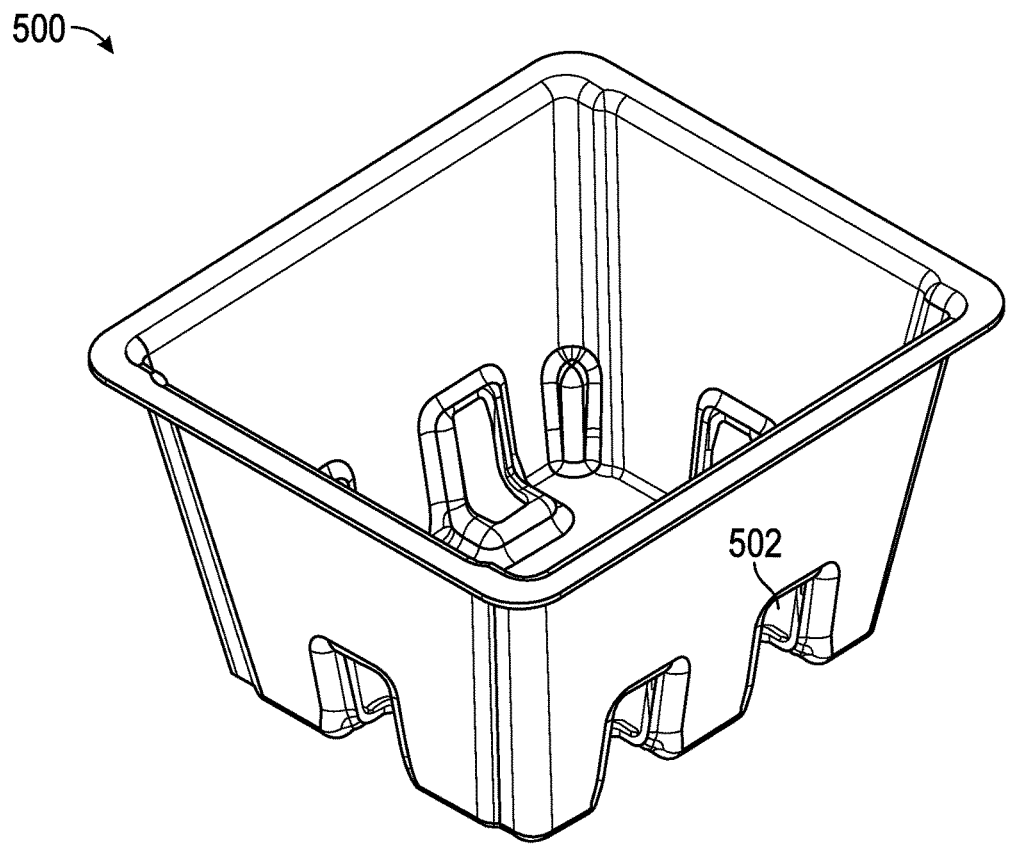
FIG. 5A is a perspective view of an exemplary produce container including extended vent holes in accordance with various embodiments.
Figure 5B:
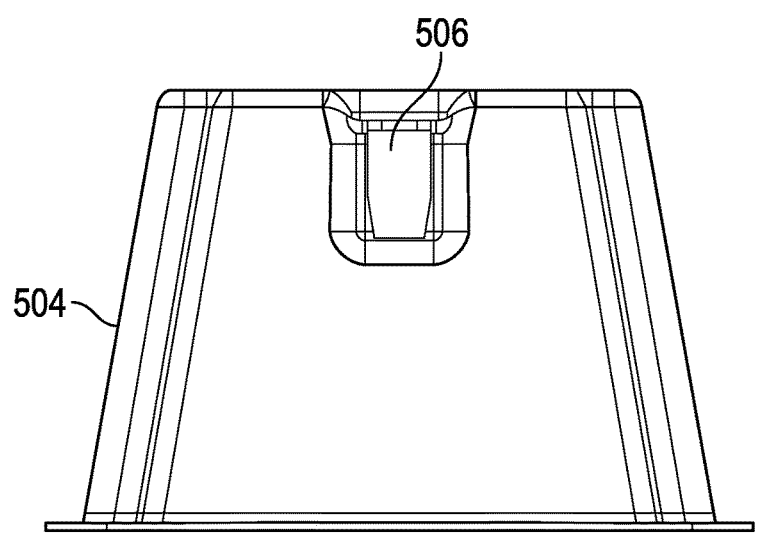
FIG. 5B is an end view of the container shown in FIG. 5A in accordance with various embodiments.

More particularly, FIG. 5A is a perspective view of an exemplary produce container 500 including extended relief holes 502. FIG. 5B is an end view of a container 504 illustrating extended vent holes 506. In this context, the term "extended vent holes" refers to holes made using the modified tooling shown in FIGS. 9-7, discussed below.

Figure 6A:
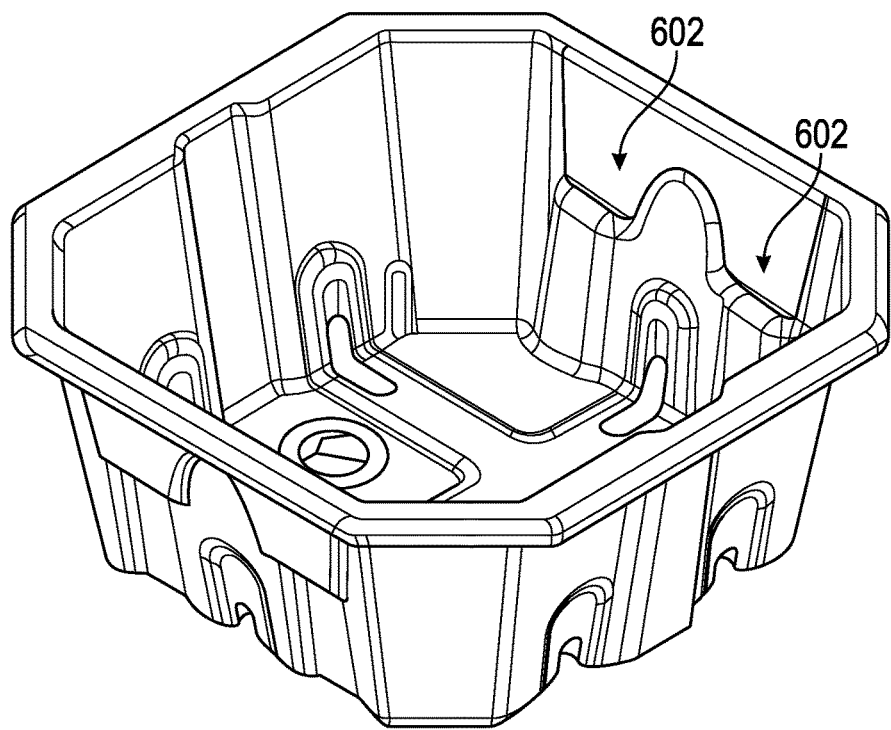
FIGS. 6A-6C are alternate embodiments of food containers illustrating various shelf and rib features in accordance with various embodiments.
Figure 6B:
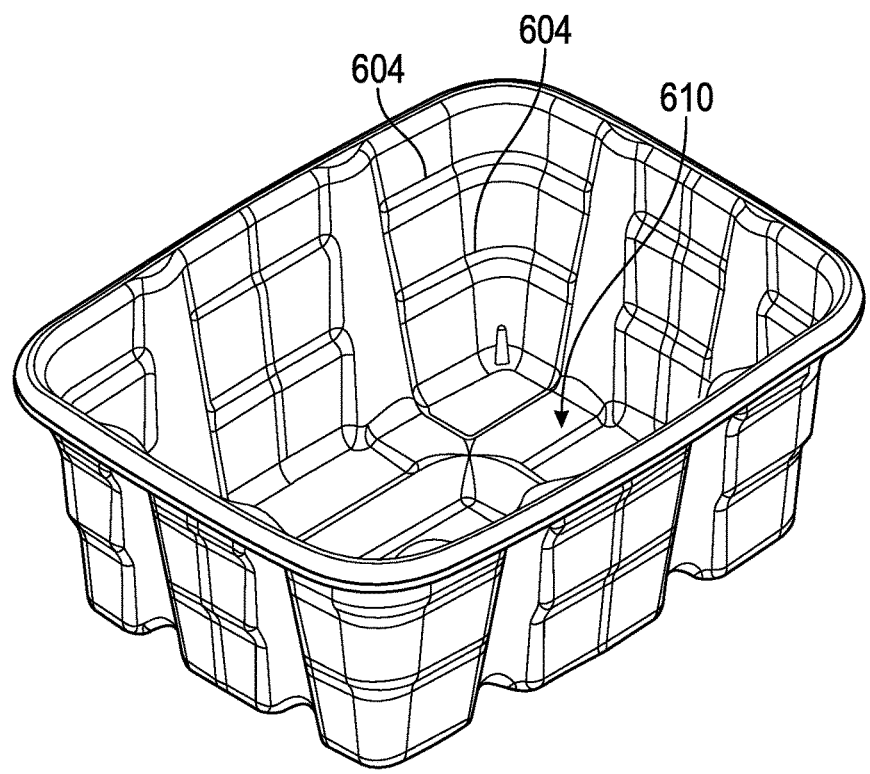
Figure 6C:
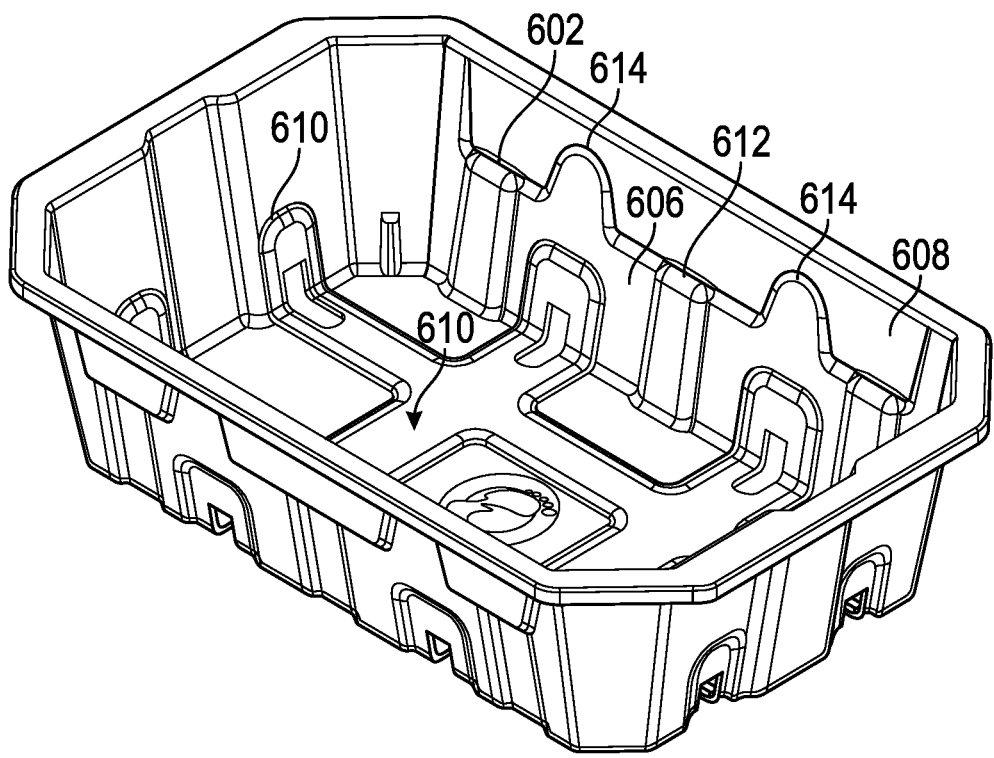

Referring now to FIGS. 6A-6C, various combinations of geometric features may be employed to enhance the structural rigidity/integrity of food containers. By way of non-limiting example, one or more horizontally extending shelfs 602, 604 may be disposed between an upper region and a lower region of a side wall. For side walls containing a single shelf, the shelf may be disposed in the range of 30%-50% of the wall height from the top of the tray, and preferably about 35%. The shelf may be created by indenting the side panel and/or varying the draft angle. For example, in the embodiment shown in FIG. 6C, a lower region 606 exhibits a draft angle in the range of about 4-6° (and preferably about 5°), while an upper region 608 exhibits a draft angle in the range of about 6-8° (and preferably about 7°).

With continued reference to FIGS. 6A-6C, various rib configurations 610 may be disposed along the bottom and up the side panels of food containers. Ribs may be configured to terminate at a shelf, above the shelf (e.g., in the upper region of a side wall, for example 25% of the distance down from the top edge), below the shelf (e.g., in the lower region of a side wall, for example 25% of the distance down from the shelf), or at the top edge of the side wall. As shown in FIG. 6C, ribs 612 may extend from the bottom of the container upwardly and terminate at the shelf, whereupon subsequent ribs 614 may be off set from the ribs 612 and extend upwardly from the shelf. The ribs may terminate in a rounded, squared, or other desired geometrical shape or configuration.

Vent Hole Tooling

Figure 7:
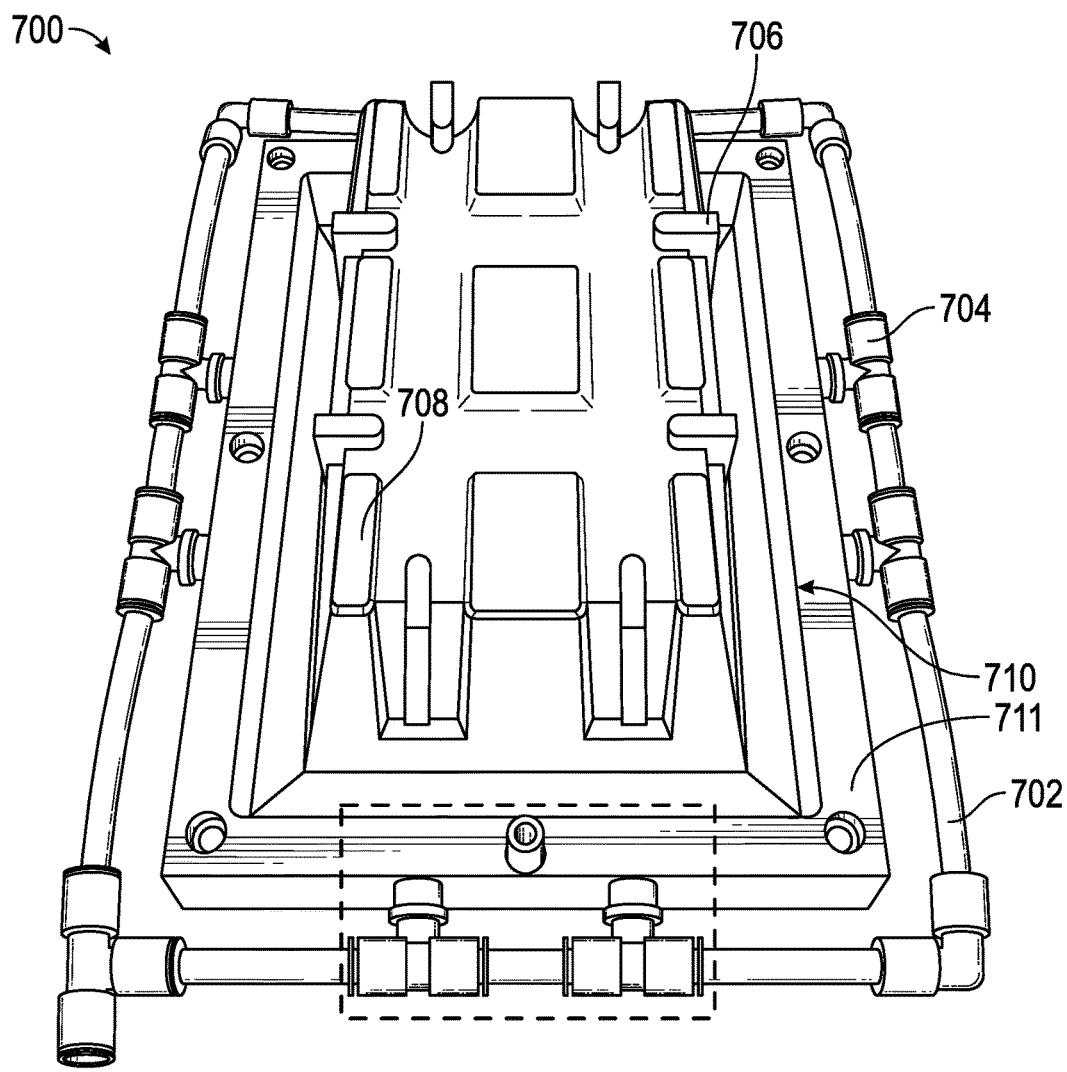
FIG. 7 is a perspective view of an exemplary rinsing tool including spray nozzles configured to rinse pulp from vent hole inserts in accordance with various embodiments.

FIG. 7 is a directional water impingement cleaning system 700 including a plurality of re-directed spray nozzles 704 configured to rinse excess pulp from vent hole inserts 706. More particularly, a mold (not shown) is covered by a wire mesh 708, the mold including the inserts which correspond to vent holes in the finished product. A supply conduit 702 distributes rinse water to a manifold 711 which includes a plurality of spray nozzles, each configured to direct rinse water to remove excess fiber proximate the inserts.

Figure 8:
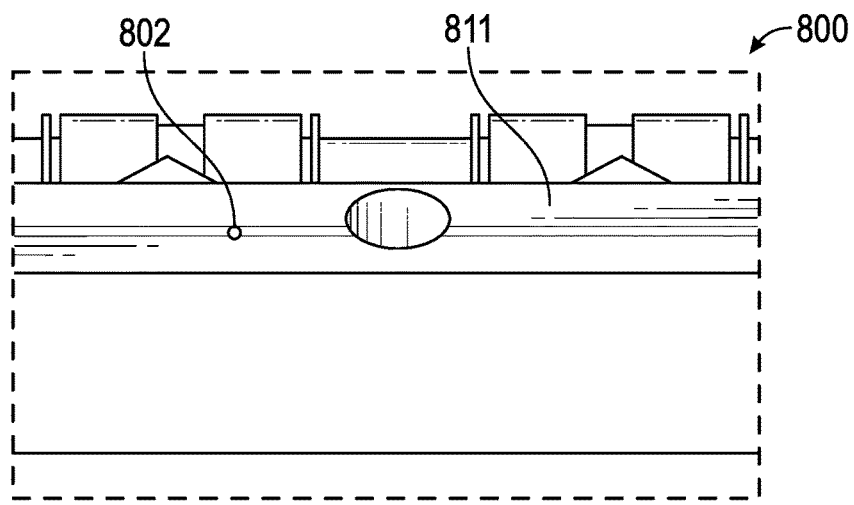
FIG. 8 is a close up view of the spray nozzles shown in FIG. 7 in accordance with various embodiments.

With momentary reference to FIG. 8, a close up view 800 of a section of a manifold 811 depicts a spray nozzle 802 configured to direct rinse water proximate a corresponding insert 706. In this way, a greater extent of the residual fibers surrounding the inserts is removed, resulting in extended vent holes in the finished produce vis-à-vis presently known systems which simply rinse the mold with water sprayed from above. Importantly, the extended vent holes may be realized without having to adjust the underlying mold or inserts.

Figure 9:
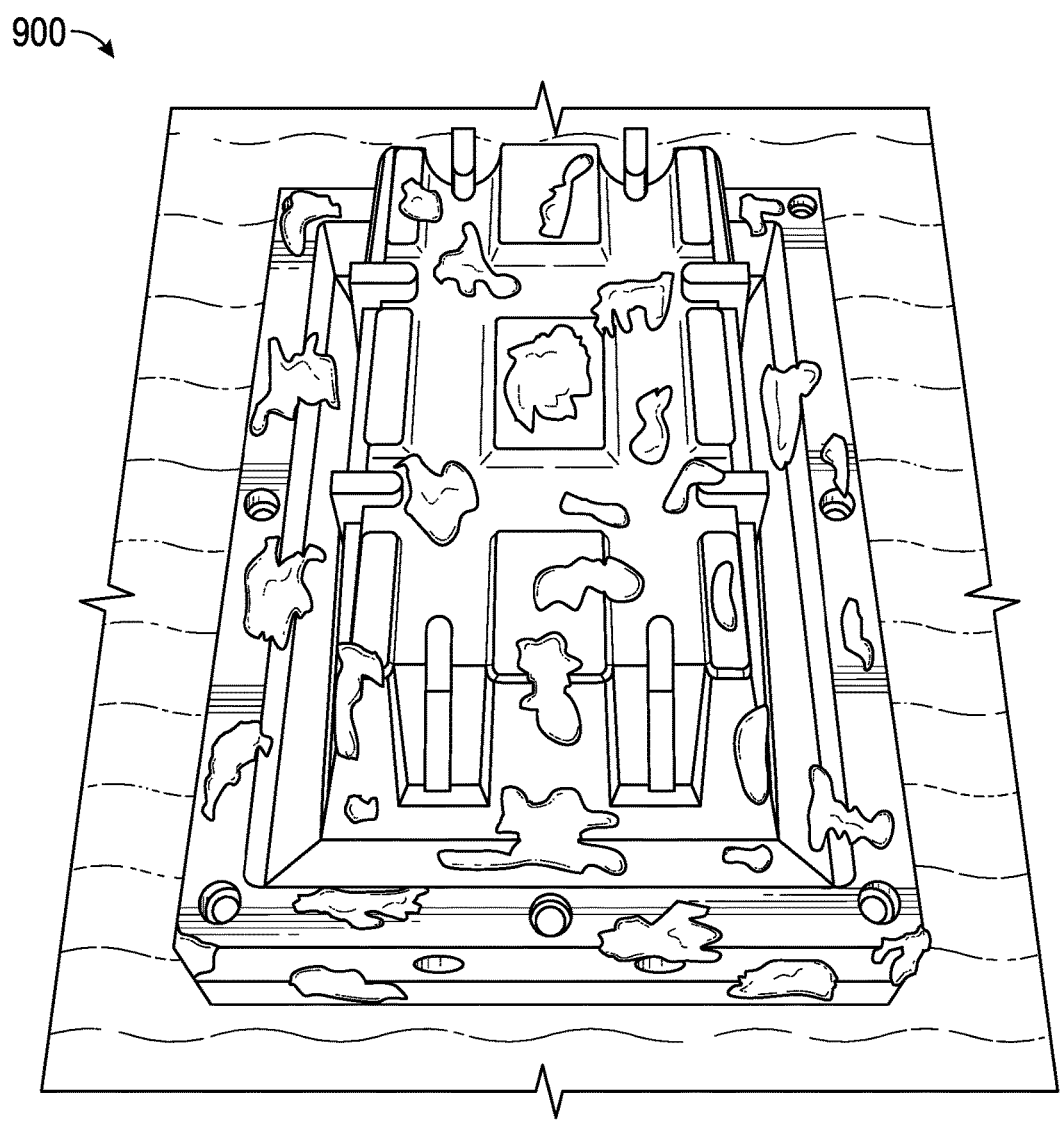
FIG. 9 is a perspective view of the excess fiber targeted for removal by the spray nozzles shown in FIGS. 7 and 8 in accordance with various embodiments.

As seen in FIG. 9, the excess fiber 900 targeted for removal by the improved spray nozzles of the present invention provides extended vent holes using existing molds and presently known inserts.

Microwavable Containers

Building on knowledge obtained from the development of the aforementioned produce containers, the present inventor has determined that molded fiber containers can be rendered suitable as single use food containers suitable for use in microwave, convection, and conventional ovens by optimizing the slurry chemistry. In particular, the slurry chemistry should advantageously accommodate one or more of the following three performance metrics: i) moisture barrier; ii) oil barrier; and iii) water vapor (condensation) barrier to avoid condensate due to placing the hot container on a surface having a lower temperature than the container. In this context, the extent to which water vapor permeates the container is related to the porosity of the container, which the present invention seeks to reduce. That is, even if the container is effectively impermeable to oil and water, it may nonetheless compromise the user experience if water vapor permeates the container, particularly if the water vapor condenses on a cold surface, leaving behind a moisture ring. The present inventor has further determined that the condensate problem is uniquely pronounced in fiber-based applications because water vapor typically does not permeate a plastic barrier.

Accordingly, for microwavable containers the present invention contemplates a fiber or pulp-based slurry including a water barrier, oil barrier, and water vapor barrier, and an optional retention aid. In an embodiment, a fiber base of softwood (SW)/bagasse at a ratio in the range of about 10%-90%, and preferably about 7:3 may be used. As a moisture barrier, AKD may be used in the range of about 0.5%-10%, and preferably about 1.5%-4%, and most preferably about 3.5%. As an oil barrier, the grease and oil repellent additives are usually water based emulsions of fluorine containing compositions of fluorocarbon resin or other fluorine-containing polymers such as UNIDYNE TG 8111 or UNIDYNE TG-8731 available from Daikin or World of Chemicals at worldofchemicals.com/chemicals/chemical-properties/unidyne-tg-8111.html. The oil barrier component of the slurry (or topical coat) may comprise, as a percentage by weight, in the range of 0.5%-10%, and preferably about 1%-4%, and most preferably about 2.5%. As a retention aid, an organic compound such as Nalco 7527 available from the Nalco Company of Naperville, Ill. May be employed in the range of 0.1%-1% by volume, and preferably about 0.3%. Finally, to strengthen the finished product, a dry strength additive such as an inorganic salt (e.g., Hercobond 6950 available at solenis.com/en/industries/tissue-towel/innovations/hercobond-dry-strength-additives/; see also http://www.sfm.state.or.us/CR2K_SubDB/MSDS/HERCOBOND_6950.PDF) may be employed in the range of 0.5%-10% by weight, and preferably about 1.5%-5%, and most preferably about 4%.

As mentioned, vapor barrier performance is directly impacted by porosity of the fiber tray. Reducing the porosity of the fiber tray and, hence, improving vapor barrier performance can be achieved using at least two approaches. One is by improving freeness of the tray material by grinding the fibers. The second way is by topical spray coating using, for example, Daikin S2066, which is a water based long chain Flourine-containing polymer. Spray coating may be implemented using in the range of about 0.1%-3% by weight, and preferably about 0.2%-1.5%, and most preferably about 1%.

Figure 10:
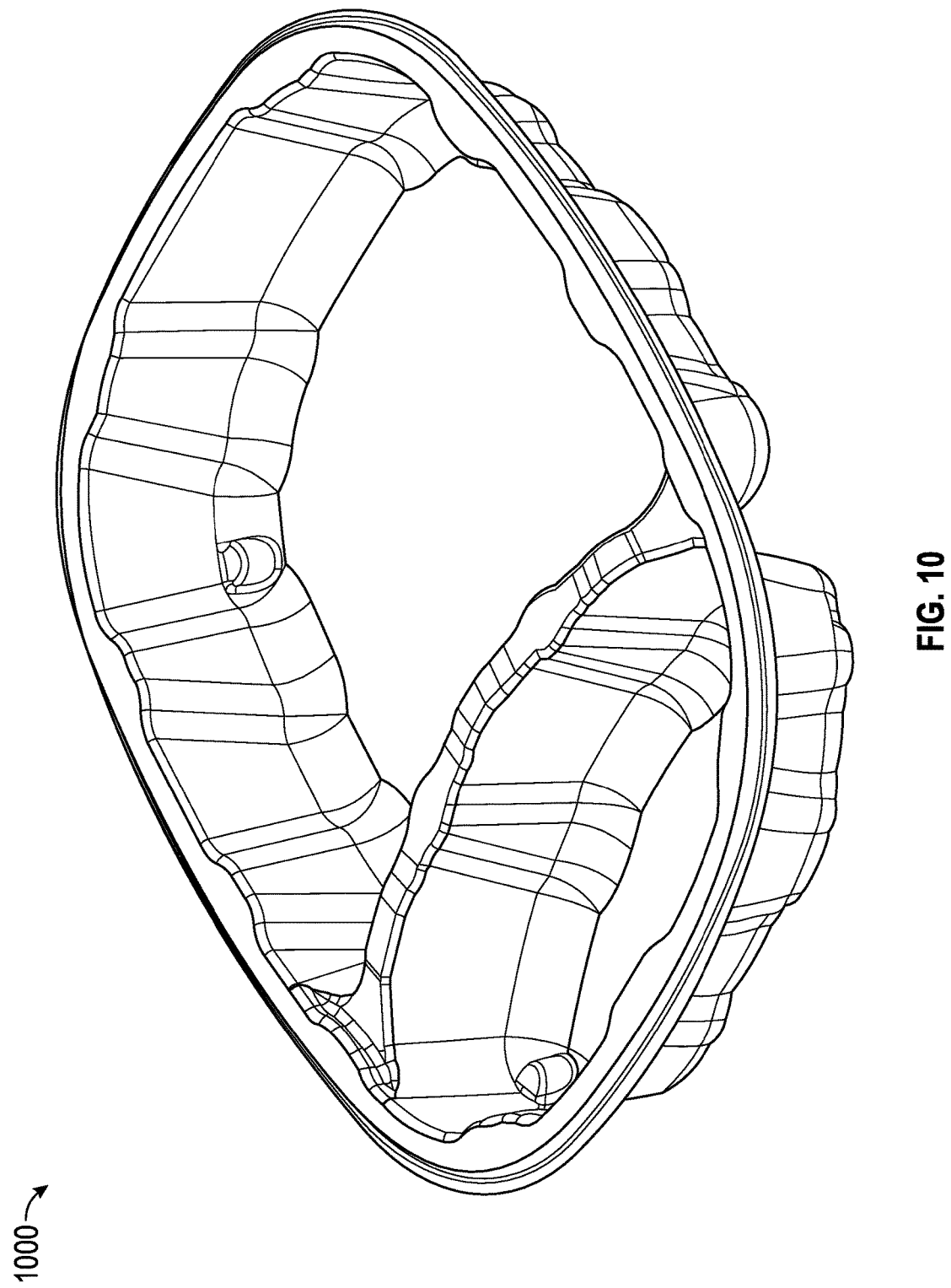
FIG. 10 is a perspective view of an exemplary microwavable food container in accordance with various embodiments.

Referring now to FIG. 10, an exemplary microwavable food container 1000 depicts two compartments; alternatively, the container may comprise any desired shape (e.g., a round bowl, elliptical, rectangular, or the like). As stated above, the various water, oil, and vapor barrier additives may be mixed into the slurry, applied topically as a spray on coating, or both.

Meat Containers

Presently known meat trays, such as those used for the display of poultry, beef, pork, and seafood in grocery stores, are typically made of plastic based materials such as polystyrene and Styrofoam, primarily because of their superior moisture barrier properties. The present inventor has determined that variations of the foregoing chemistries used for microwavable containers may be adapted for use in meat trays, particularly with respect to the moisture barrier (oil and porosity barriers are typically not as important in a meat tray as they are in a microwave container).

Accordingly, for meat containers the present invention contemplates a fiber or pulp-based slurry including a water barrier and an optional oil barrier. In an embodiment, a fiber base of softwood (SW)/bagasse and/or bamboo/bagasse at a ratio in the range of about 10%-90%, and preferably about 7:3 may be used. As a moisture/water barrier, AKD may be used in the range of about 0.5%-10%, and preferably about 1%-4%, and most preferably about 4%. As an oil barrier, a water based emulsion may be employed such as UNIDYNE TG 8111 or UNIDYNE TG-8731. The oil barrier component of the slurry (or topical coat) may comprise, as a percentage by weight, in the range of 0.5%-10%, and preferably about 1%-4%, and most preferably about 1.5%. Finally, to strengthen the finished product, a dry strength additive such as Hercobond 6950 may be employed in the range of 0.5%-10% by weight, and preferably about 1.5%-4%, and most preferably about 4%.

As discussed above in connection with the produce containers, the slurry chemistry may be combined with structural features to provide prolonged rigidity over time by preventing moisture/water from penetrating into the tray.

Figure 11A:
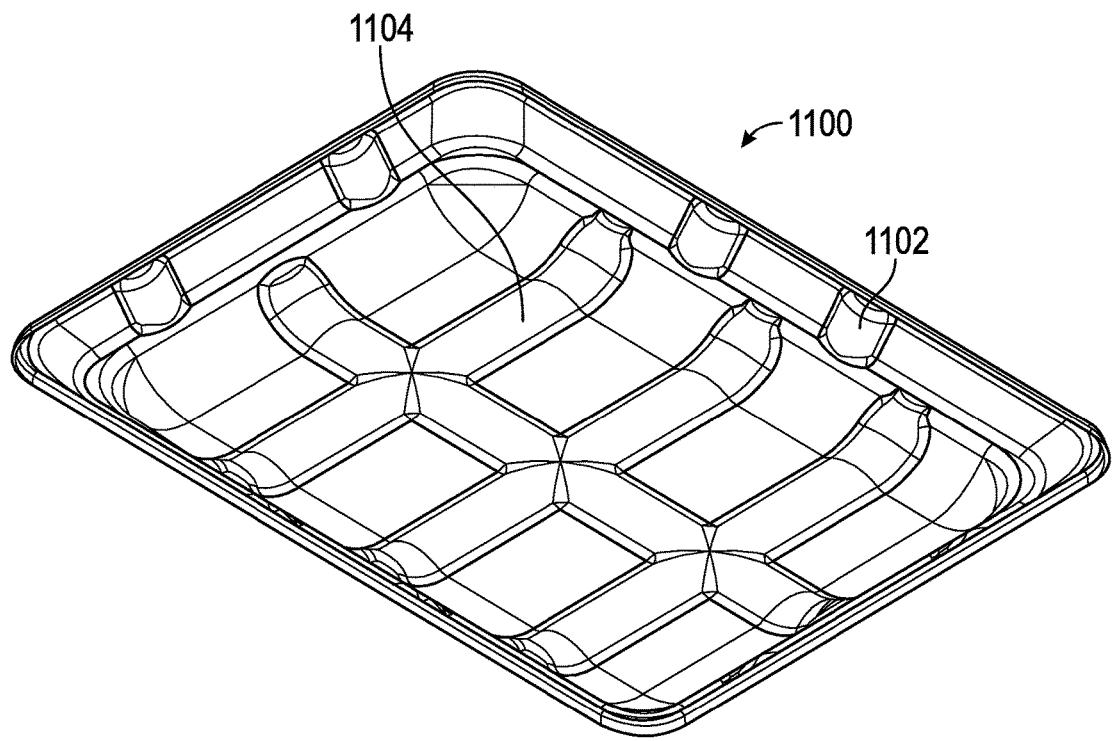
FIG. 11A is a perspective view of an exemplary meat container in accordance with various embodiments.
Figure 11B:
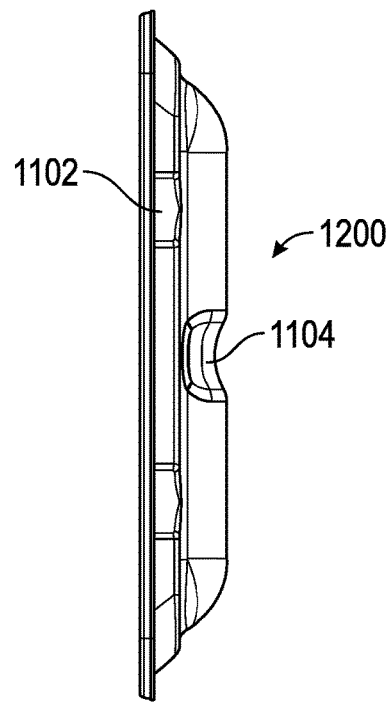
FIG. 11B is an end view of the microwavable food container shown in FIG. 11A in accordance with various embodiments.

FIG. 11A is a perspective view of an exemplary meat container 1100, and FIG. 11B is an end view of the meat container shown in FIG. 11A including sidewall ribs 1102 and bottom ribs 1104.

Figure 12:
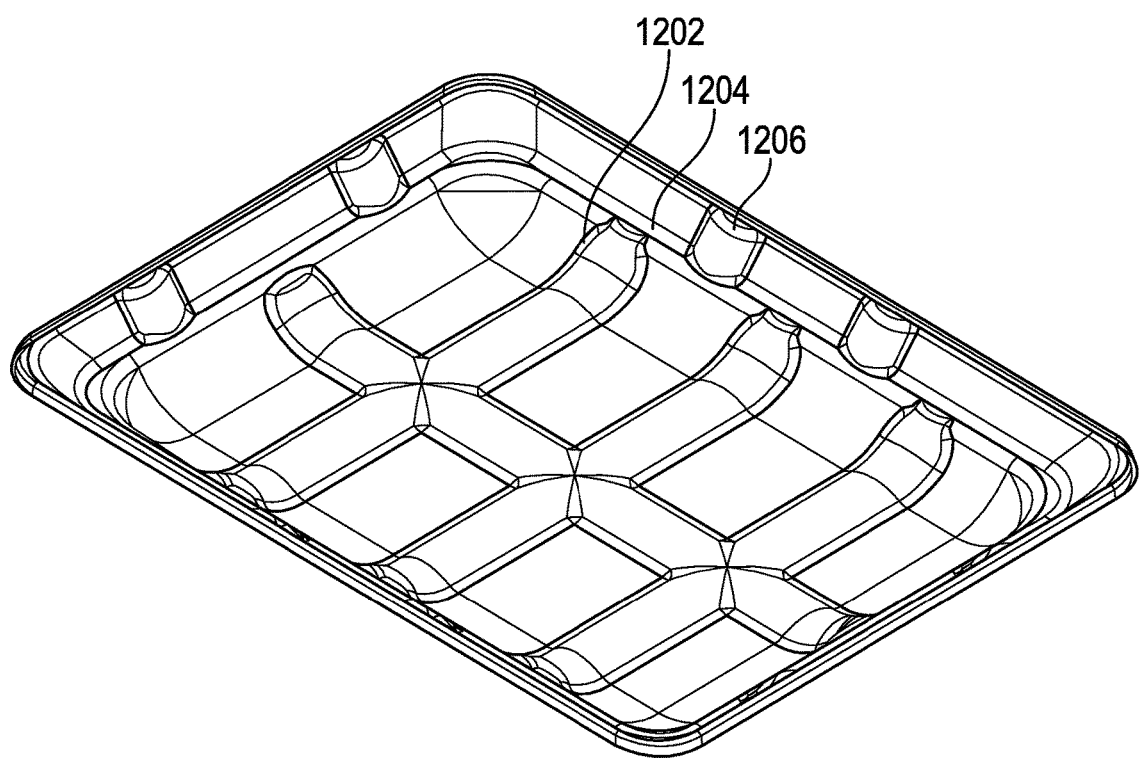
FIG. 12 is an alternative embodiment of a shallow food tray illustrating a shelf having off-set ribs in accordance with various embodiments.

FIG. 12 is a perspective view of an exemplary shallow meat container 1200 including a rib 1202 extending along the bottom and upwardly along the side wall, terminating at a shelf 1204. A second rib 1206, offset from the first rib 1202, extends upwardly from the shelf.

Beverage Lids

Although fiber and pulp based paper cups are widely known, the beverage industry still needs a sustainable fiber-based lid solution. A significant impediment to the widespread adoption of fiber-based lids surrounds the ability to incorporate a zero or negative draft into the lid, in a manner which allows it to be conveniently removed from the mold. In addition, the fiber-based chemistry must be adapted to provide an adequate moisture/water barrier so that the rigidity of the lid is not compromised in the presence of liquid. The methods, chemical formulae, and tooling contemplated by the present invention addresses both of these issues in a manner heretofore not address by the prior art.

In particular, the chemistry for lids is similar to meat trays and microwave bowls discussed above. Specifically, for beverage container lids the present invention contemplates a fiber or pulp-based slurry including a water/moisture barrier and an optional retention aid. In an embodiment, a fiber base of softwood (SW)/bagasse and/or bamboo/bagasse at a ratio in the range of about 10%-90%, and preferably about 7:3 may be used. As a moisture/water barrier, AKD may be used in the range of about 0.5%-10%, and preferably about 1%-4%, and most preferably about 4%. Rigidity may be enhanced by Hercobond 6950 in the range of 0.5%-10% by weight, and preferably about 1%-4%, and most preferably about 2% or, alternatively, an equal amount as dry strength additives used in the system. Kymene may also be added in the range of 0.5%-10%, and preferably about 1%-4%, and most preferably about 3%. In various embodiments, the Hercobond and/or the Kymene (or functionally analogous additives) may be added to the slurry before addition of the AKD.

Figure 13:
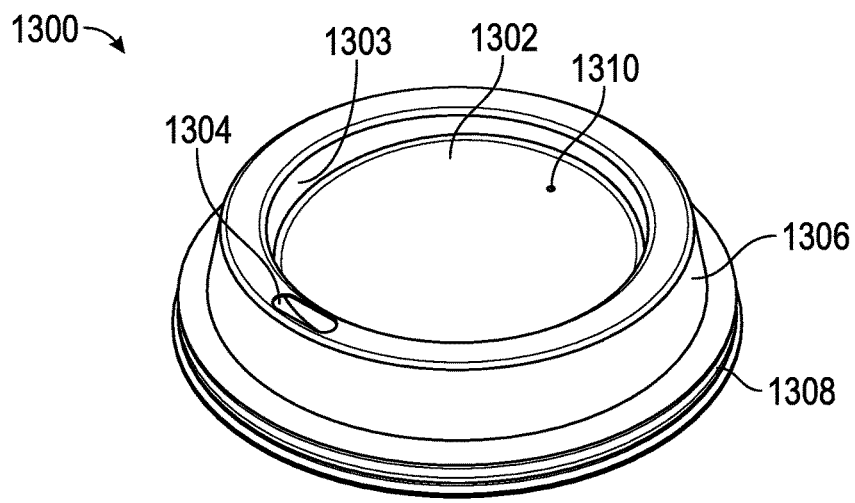
FIG. 13 is a perspective view of an exemplary lid for a liquid (e.g., soup or a beverage such as coffee or soda) container in accordance with various embodiments.
Figure 14:
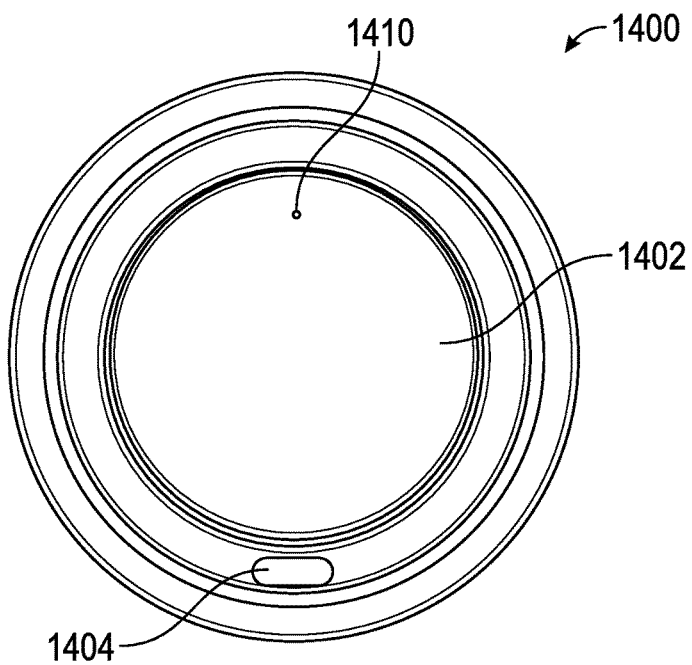
FIG. 14 is a top view of the lid shown in FIG. 13 in accordance with various embodiments.

Referring now to FIG. 13, an exemplary lid 1300 includes an inclined platform 1302 surrounded by a retaining wall 1303 designed to urge liquid which leaves the inside of the container toward a sip hole 1304. A small venting aperture 1310 may be disposed on the platform 1302. A crown 1306 defines a volumetric space between the top of the cup (not shown) and the platform 1302, and a lock ring 1308 is configured to securely snap around the top of the cup. FIG. 14 is a top view of the lid shown in FIG. 13, including a platform 1402 venting aperture 1410, and sip hole 1404 for comparison.

Figure 15:
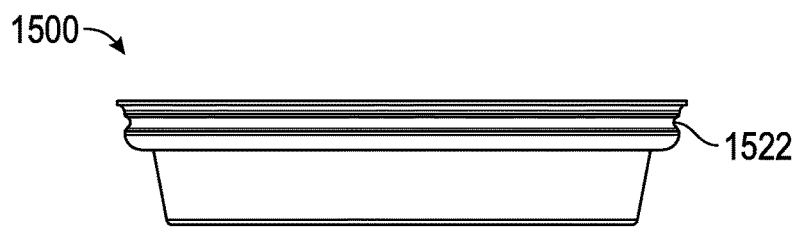
FIG. 15 is a side elevation view of the lid shown in FIGS. 13 and 14 in accordance with various embodiments.

FIG. 15 is a side elevation view of a lid 1500, highlighting a negative draft 1522 associated with the lock ring. Conventional wisdom suggests that vacuum molded products may not embody zero or negative draft features, because conventional vacuum mold tooling does not allow the finished part to be removed from the tool, inasmuch as the negative draft feature would "lock" the part to the tool in much the same way as the finished part "locks" itself to its mating component (here, the beverage cup). To overcome this limitation, the present invention contemplates a vacuum mold tool which removes the lid from the mold, notwithstanding the presence of the zero or negative draft locking feature, as described in greater detail below in conjunction with FIGS. 13-18.

Lid Tooling

A tool for making a fiber-based lid having a zero or negative draft comprises a retractable piston having a shape which generally to a mirror image of the lid, and which is configured to extend to unlock the finished lid from that part of the mold which the lid locks to.

Figure 16:
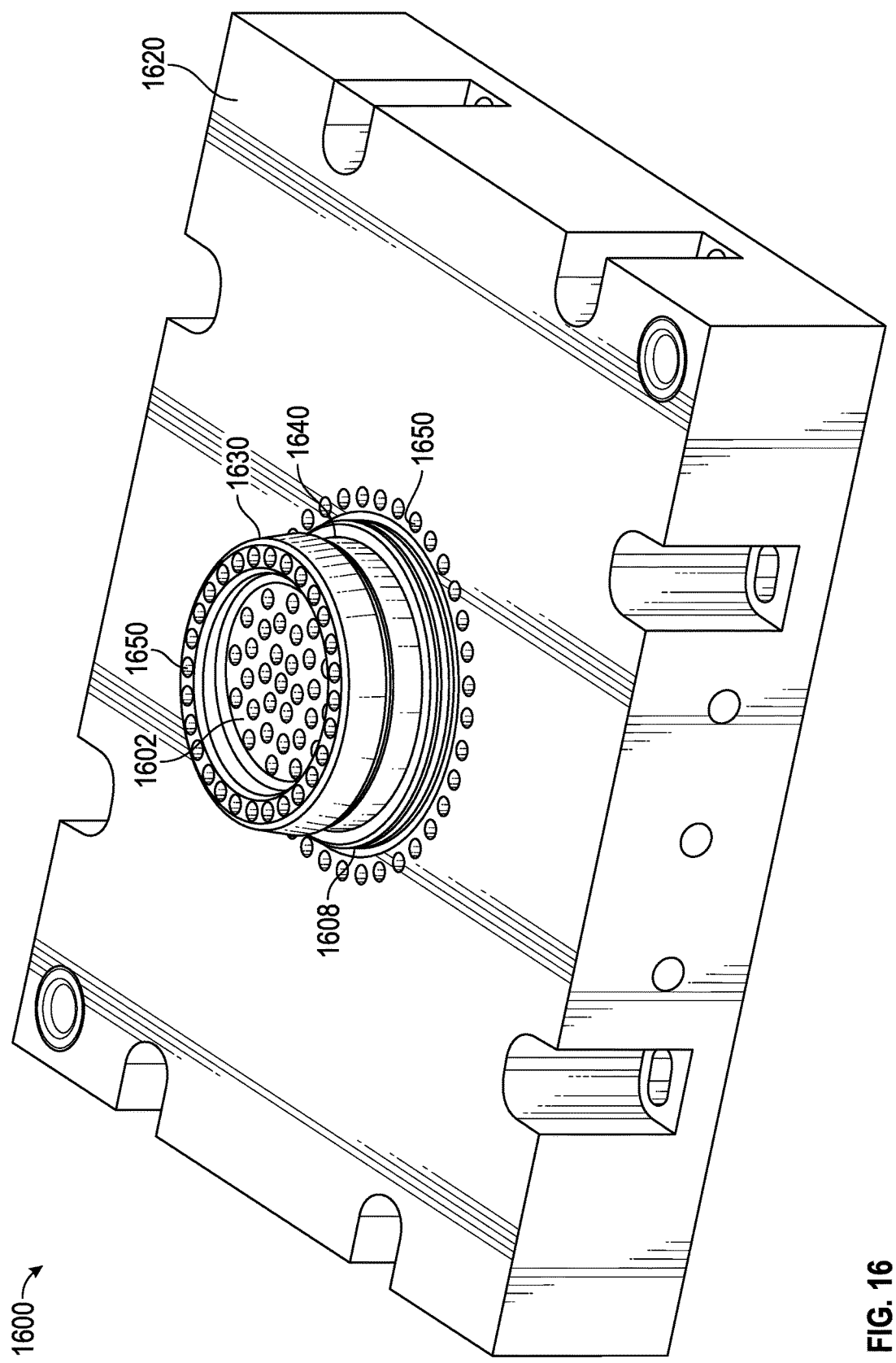
FIG. 16 is a perspective view of an exemplary mold for use in manufacturing the lid shown in FIGS. 13-15 in accordance with various embodiments.

Referring now to FIG. 16, is a perspective view of an exemplary mold assembly for use in manufacturing the lid shown in FIGS. 13-15 in accordance with various embodiments. More particularly, a mold assembly 1600 includes a mold block 1620 supporting a lock ring mold portion 1608 (corresponding to the lock ring 1308 of FIG. 13), a retractable piston assembly comprising a crown portion 1630 having an inclined platform 1602 (corresponding to the inclined platform 1302 of FIG. 13), and a shaft portion 1640. In operation, a lid is vacuumed formed in a slurry bath (not shown) and then transferred onto the hot press shown in FIG. 16. A female portion of the lid tool then compresses the wet vacuumed formed lid using heat and pressure.

Figure 17:
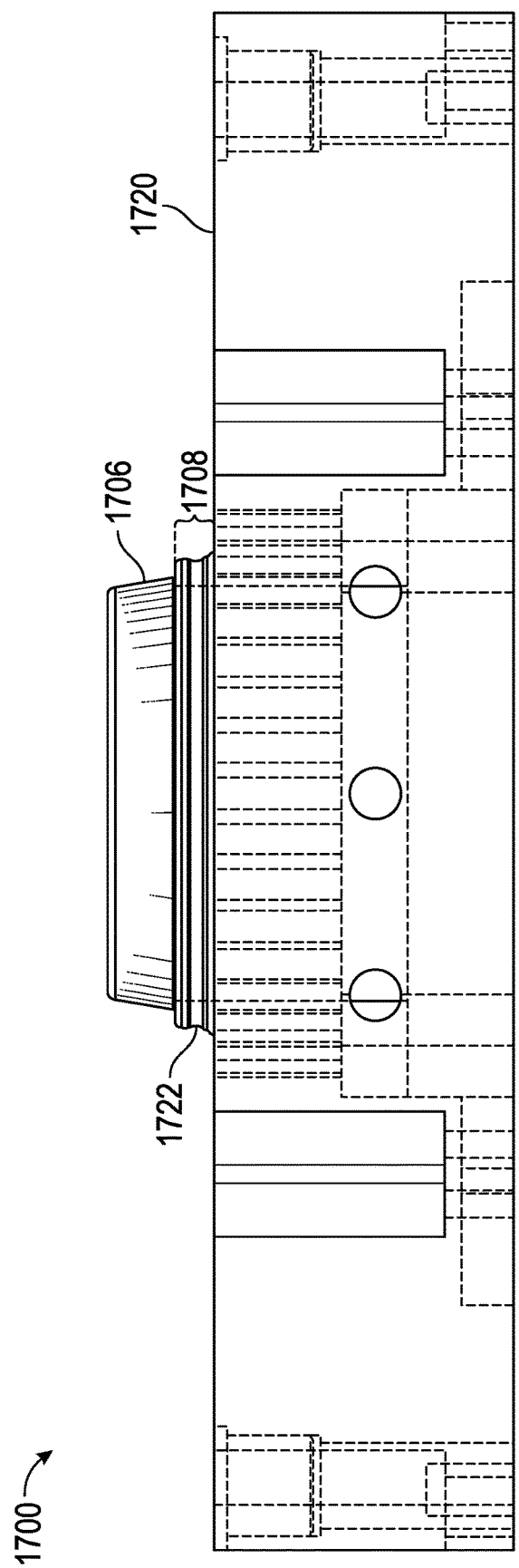
FIG. 17 is a side elevation view of the mold of FIG. 16 shown in the retracted position in accordance with various embodiments.

FIG. 17 is a side elevation view of the mold of FIG. 16 shown in the retracted position. In particular, the crown portion 1706 of the piston is adjacent the lock ring portion 1708 of the mold block 1720 when the piston is in the retracted position shown in FIG. 17. When the lid is formed when pressed, the negative draft portion 1522 of the lid (see FIG. 15) locks around the corresponding negative draft portion 1722 of the lock ring portion 1708 of the mold. In order to remove the finished part from the mold, the piston is extended upwardly, forcing the lock ring of the lid to momentarily expand and unlock from the mold.

Figure 18:
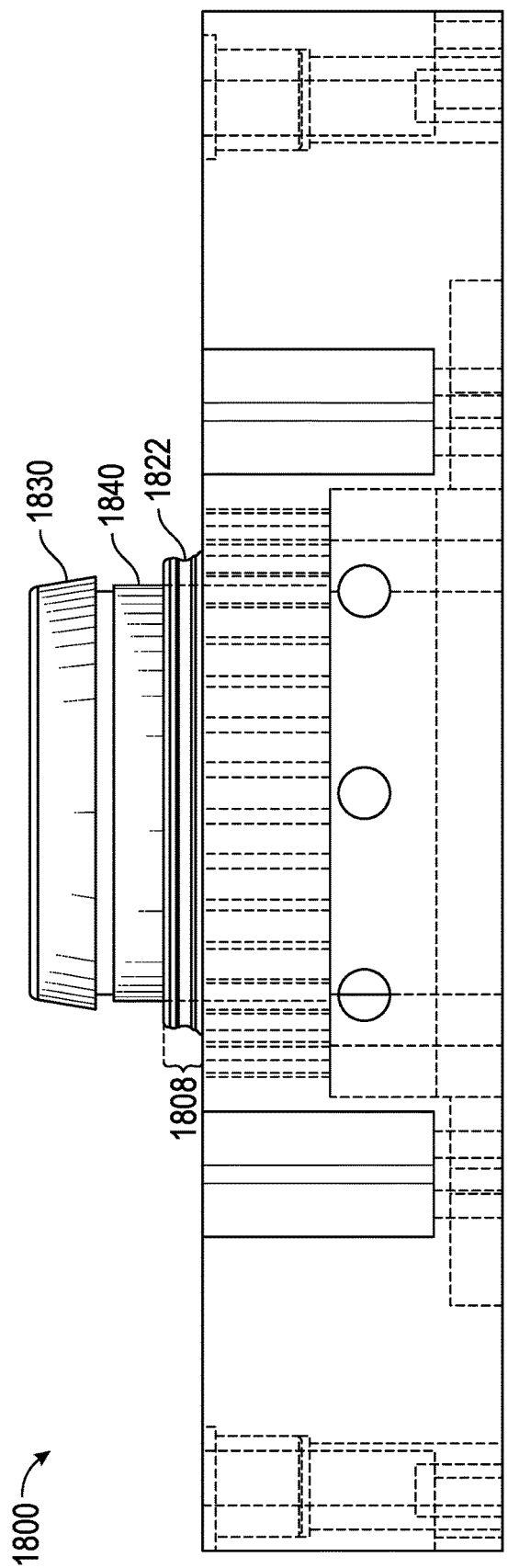
FIG. 18 is a side elevation view of mold of FIG. 17 shown in the extended position in accordance with various embodiments.

FIG. 18 shows the piston in the extended position. In particular, the shaft 1840 forces the crown portion 1830 away from the lock ring portion 1808, unlocking the lid from the negative draft feature 1822 of the mold. In an embodiment, the piston is extended pneumatically, and allowed to retract by its own weight once the high pressure air is released.

Utility and Shipping Containers

Figure 19:
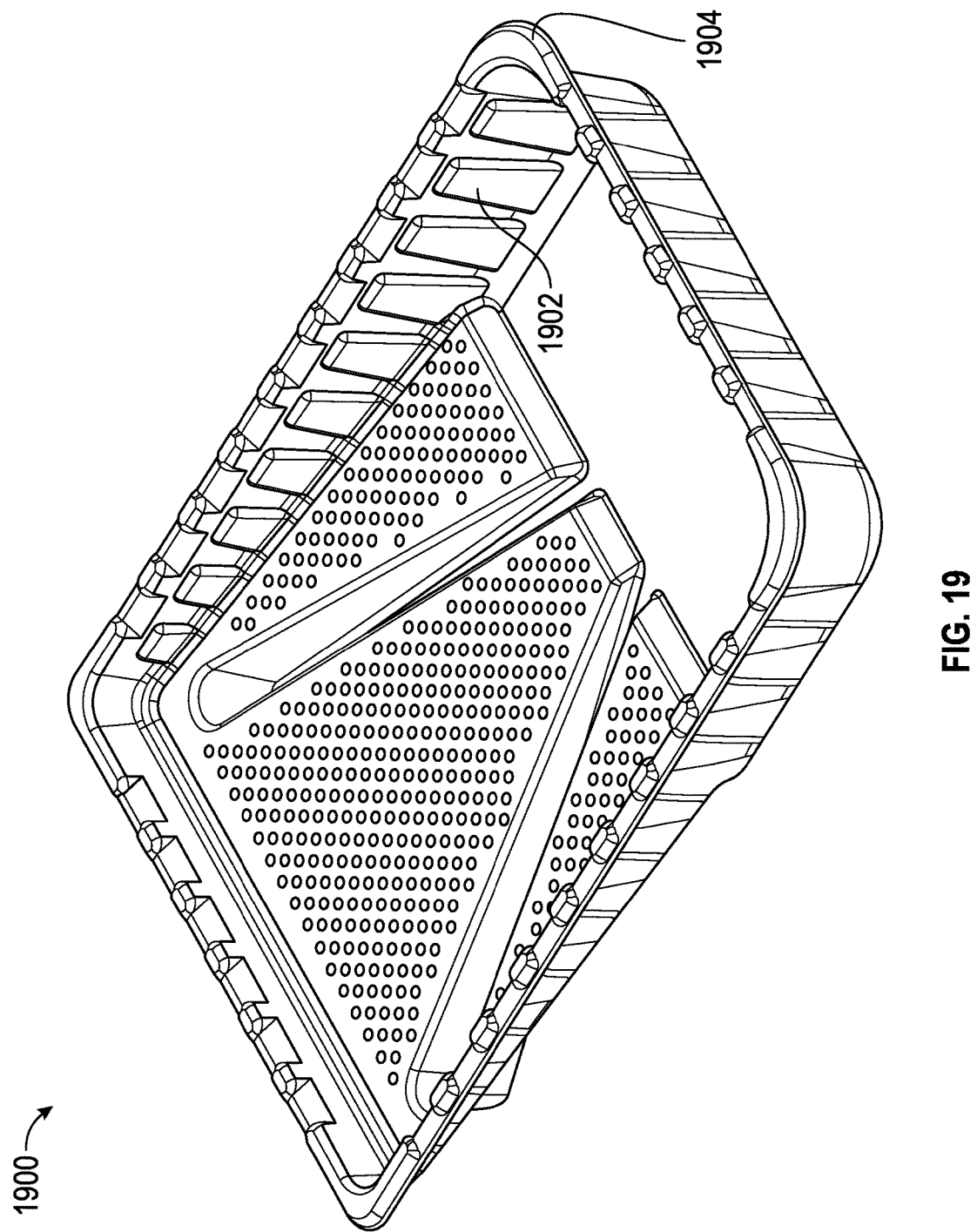
FIG. 19 is a perspective view of utility (non-food) container in accordance with various embodiments.

FIG. 19 is a perspective view of utility (non-food) container 1900 including sidewall ribs 1902 and a perimeter lip 1904 in accordance with various embodiments. Depending on the nature of the contained material, any one or combination of the aforementioned chemistries may be used in the construction of the container. For example, if the contained liquid includes a water component, a suitable moisture/water barrier may be employed; if the contained material includes an oil component, a suitable oil barrier may be employed, and so on.

While the present invention has been described in the context of the foregoing embodiments, it will be appreciated that the invention is not so limited. For example, the various geometric features and chemistries may be adjusted to accommodate additional applications based on the teachings of the present invention.

A method is thus provided for manufacturing a produce container. The method includes: forming a wire mesh over a mold comprising a mirror image of the produce container; immersing the wire mesh in a fiber-based slurry bath; drawing a vacuum across the wire mesh to cause fiber particles to accumulate at the wire mesh surface; and removing the wire mesh from the slurry bath; wherein the slurry comprises a moisture/water barrier component in the range of 1.5%-4% by weight.

In an embodiment the slurry comprises a moisture barrier component in the range of about 4%.

In an embodiment the moisture barrier component comprises alkyl ketene dimer (AKD).

In an embodiment the moisture barrier component comprises alkyl ketene dimer (AKD) 80.

In an embodiment the slurry comprises a fiber base of OCC/NP at a ratio in the range of 0.5/9.5.

In an embodiment the slurry further comprises a dry strength component in the range of 1%-7% by weight.

In an embodiment the starch component comprises a cationic liquid starch.

In an embodiment the slurry further comprises a wet strength component such as Kymene (e.g., Kymene 577) in the range of 1%-4% by weight.

In an embodiment the mold comprises a rolled edge including a vertically descending skirt.

In an embodiment the moisture/water barrier comprises AKD in the range of about 4%, wherein the AKD may be added to the pulp slurry as a diluted solution (e.g., 1:10 ADK:Water); the slurry comprises a cationic liquid starch component in the range of 1%-7%; and the mold comprises a rolled edge including a vertically descending skirt, at least one bottom rib, and at least one sidewall rib.

A produce container manufactured according to the foregoing methods is also provided.

In a vacuum mold assembly of the type including a wire mesh surrounding a mold form having a substantially vertical insert configured to provide a vent hole in a finished container, a directional rinse assembly is provided. The directional rinse assembly includes: a water supply conduit; a manifold connected to the water supply conduit; and a spray nozzle connected to the manifold and configured to direct a spray of water at the insert along a vector having a horizontal component.

In an embodiment the mold includes a plurality of substantially vertical inserts, and the directional rinse assembly further includes a plurality of spray nozzles, each configured to direct a spray of water at respective inserts along respective vectors each having a horizontal component.

A method is also provided for manufacturing a zero or nearly zero porosity food container. This method includes a wet press procedure as the first step, followed by an extra surface coating procedure for applying a thin layer of water based long chain fluorine-containing polymers such as Daikin S 2066, in the range of about 0.5%-6% by weight, and preferably about 1%-5%, and most preferably about 4%.

A method is also provided for manufacturing a microwavable and/or oven worthy food container. The method includes: forming a wire mesh over a mold comprising a mirror image of the microwavable food container; immersing the wire mesh in a fiber-based slurry bath; drawing a vacuum across the wire mesh to cause fiber particles to accumulate at the wire mesh surface; and removing the wire mesh from the slurry bath; wherein the slurry comprises a moisture barrier component in the range of 0.5%-10% by weight, an oil barrier in the range of 0.5%-10% by weight, and a retention aid in the range of 0.05%-5% by weight.

In an embodiment the moisture/water barrier component is in the range of about 1.5%-4%, the oil barrier is in the range of about 1%-4%, and the retention aid is in the range of about 0.1%-0.5%.

In an embodiment the moisture barrier component comprises alkyl ketene dimer (AKD) 80.

In an embodiment the moisture barrier component comprises alkyl ketene dimer (AKD) 79.

In an embodiment the slurry comprises a fiber base of SW/bagasse at a ratio in the range of 0.5/9.5.

In an embodiment the slurry further comprises a rigidity component in the range of 1%-5% by weight.

In an embodiment the rigidity component comprises a dry inorganic salt.

In an embodiment the oil barrier comprises a water based emulsion.

In an embodiment the oil barrier comprises TG 8111.

In an embodiment the retention aid comprises an organic compound.

In an embodiment the retention aid comprises Nalco 7527.

In an embodiment the moisture/water barrier comprises AKD in the range of about 4%; the slurry comprises bagasse and a dry inorganic salt; the oil barrier comprises a water based emulsion; and the vapor barrier comprises an organic compound.

A microwavable container manufactured according to the foregoing methods is also provided.

A method of manufacturing a meat tray is provided, the method including: forming a wire mesh over a mold comprising a mirror image of the meat tray; immersing the wire mesh in a fiber-based slurry bath; drawing a vacuum across the wire mesh to cause fiber particles to accumulate at the wire mesh surface; and removing the wire mesh from the slurry bath; wherein the slurry comprises a moisture/water barrier component in the range of 0.5%-10% by weight and an oil barrier in the range of 0.5%-10% by weight.

In an embodiment the moisture/water barrier component is in the range of about 1%-4% and the oil barrier is in the range of about 1%-4.

In an embodiment the moisture barrier component comprises alkyl ketene dimer (AKD).

In an embodiment the moisture barrier component comprises alkyl ketene dimer (AKD) 79.

In an embodiment the slurry comprises a fiber base of SW/bagasse at a ratio in the range of 1/9.

In an embodiment the slurry includes a rigidity component in the range of 1.5%-4% by weight.

In an embodiment the rigidity component comprises a dry inorganic salt.

In an embodiment the oil barrier comprises a water based emulsion.

In an embodiment the oil barrier comprises TG 8111 in the range of about 1.5% by weight; the TG8111 may be added to the pulp slurry as a diluted solution (e.g., 1:5, TG8111: Water).

In an embodiment the moisture/water barrier comprises AKD in the range of about 4%; the slurry comprises bagasse and a dry inorganic salt; and the oil barrier comprises a water based emulsion.

A meat tray manufactured according to the foregoing methods is also provided.

In an embodiment the meat tray includes at least one sidewall rib and at least one bottom rib.

A method of manufacturing a lid for a beverage container is also provided. The method includes: forming a wire mesh over a mold comprising a mirror image of the lid; immersing the wire mesh in a fiber-based slurry bath; drawing a vacuum across the wire mesh to cause fiber particles to accumulate at the wire mesh surface; and removing the wire mesh from the slurry bath; wherein the slurry comprises a moisture/water barrier component in the range of 0.5%-10% by weight, a rigidity component in the range of 1%-4% by weight, and a polycationic component in the range of about 1%-4%.

In an embodiment the moisture/water barrier component is in the range of about 1%-4% and the oil barrier is in the range of about 1%-4.

In an embodiment the moisture barrier component comprises alkyl ketene dimer (AKD).

In an embodiment the moisture barrier component comprises alkylene dimer (AKD) 80.

In an embodiment the slurry comprises a fiber base of SW/bagasse at a ratio in the range of 1/9.

In an embodiment the slurry further comprises a rigidity component in the range of 1.%-4% by weight.

In an embodiment the rigidity component comprises a dry inorganic salt.

In an embodiment the moisture/water barrier comprises AKD in the range of about 4%; the slurry comprises bagasse and a dry inorganic salt; and the slurry comprises a polycationic material in the range of about 1%-4% by weight.

A lid manufactured according to the foregoing methods is also provided.

In an embodiment the lid further includes a lock ring having a non-positive draft.

A vacuum tool is also provided for manufacturing a fiber-based beverage lid having a crown and a lock ring including a negative draft. The tool includes: a mold block supporting a lock ring mold portion corresponding to the lid lock ring; a retractable piston assembly comprising a crown mold portion corresponding to the lid crown and a piston shaft; and a pneumatic actuator configured to extend the piston shaft to thereby remove the lid lock ring from the lock ring mold portion.

In an embodiment the vacuum tool further includes a wire mesh removably surrounding the crown mold portion and the lock ring mold portion.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A method of manufacturing a fiber-based produce container, comprising:
   providing a slurry mixture comprising: i) a fiber base of at least one of old corrugated containers (OCC) and newsprint (NP); ii) an alkyl ketene dimer (AKD) based moisture barrier component in the range of 1%-10% by weight; iii) a coloring agent comprising one of a cationic dye and a fiber reactive dye; iv) a dye absorption agent comprising one of salt and soda ash; and v) a cationic liquid starch component in the range of 1%-7% by weight;
   providing a mesh mold corresponding to the produce container wherein the mesh mold defines a horizontally extending shelf disposed in the range of about 30-50% below a top of a container side wall;
   immersing the mesh in the slurry mixture;
   drawing a vacuum across the mesh mold to cause fiber particles to accumulate at the mesh surface to thereby form the produce container; and
   thereafter removing the produce container from the slurry mixture and drying the produce container by placing the produce container in an oven.

2. The method of claim 1, wherein the moisture barrier component in the range of about 4%.

3. The method of claim 1, wherein the moisture barrier component comprises long chain diketenes.

4. The method of claim 1, further comprising processing the mesh having the accumulated fiber particles in one of a wet or dry process.

5. The method of claim 1, wherein the starch component comprises modified polyamines that form both hydrogen and ionic bonds with fibers.

6. The method of claim 1, wherein the starch component comprises a polyamide epichlorohydrin (PAE) resin.

7. The method of claim 1, wherein the slurry mixture comprises old corrugated containers (OCC) in the range of about 70% and newsprint (NP) in the range of about 30%.

8. A method of recycling paper products into a produce container using a vacuum molding process, the method comprising:
   mixing water, a starch component, a moisture barrier component which is different from the starch component, and at least one of old corrugated containers (OCC) and newsprint (NP) to produce a slurry;
   immersing a mesh mold in the shape of the produce container into the slurry;
   drawing a vacuum across the mold to thereby form the produce container; and
   removing the produce container from the slurry and drying the produce container in an oven.

9. The method of claim 8, wherein the mold comprises a horizontal shelf feature disposed in the range of about 30%-50% below a top of a container side wall.

10. The method of claim 8, wherein the moisture barrier component comprises alkyl ketene dimer (AKD) in the range of 1%-10% of the slurry weight.

11. The method of claim 8, further comprising:
   mixing a coloring agent comprising one of a cationic dye and a fiber reactive dye into the slurry; and
   mixing a dye absorption agent comprising one of salt and soda ash into the slurry.

12. The method of claim 8, wherein the moisture barrier component comprises in the range of about 4% of the slurry weight.

13. The method of claim 8, wherein the slurry comprises a old corrugated containers (OCC) and newsprint (NP).

14. The method of claim 8, wherein the starch component comprises a cationic liquid starch.

15. A method of vacuum forming a produce container using a slurry made from recycled paper products, comprising the steps of:
   providing a slurry comprised of: i) old corrugated containers (OCC); ii) newsprint (NP); iii) a moisture barrier component; iv) a coloring agent comprising one of a cationic dye and a fiber reactive dye; v) a dye absorption agent comprising one of salt and soda ash; and vi) a cationic liquid starch component;
   providing a mesh mold corresponding to the shape of the produce container, the mesh mold defining a horizontally extending shelf disposed in the range of about 30%-50% below a top of a container side wall;
   immersing the mold into the slurry;
   drawing a vacuum across the mold to thereby form the produce container; and
   removing the produce container from the slurry and drying the produce container;
   wherein the moisture barrier component comprises alkyl ketene dimer (AKD) in the range of 1%-10% of the slurry weight.

* * * * *